United States Patent Office 3,520,831
Patented July 21, 1970

3,520,831
ELECTRICALLY CONDUCTIVE GLASS FOR A SECONDARY EMISSION ELECTRODE
Hendrikus Johan Lodewijk Trap, Emmasingel, Eindhoven, Netherlands, assignor to U.S. Philips Corporation, New York, N.Y., a corporation of Delaware
No Drawing. Filed Jan. 4, 1967, Ser. No. 607,147
Claims priority, application Netherlands, Jan. 29, 1966, 6601167; Sept. 13, 1966, 6612854
Int. Cl. H01b $1/08$; H01j $43/00$
U.S. Cl. 252—518                     5 Claims

ABSTRACT OF THE DISCLOSURE

A glass composition especially adapted for use in a secondary-emissive electrode which composition consists of $V_2O_5$—$P_2O_5$—$PbO$ containing a small amount of $As_2O_3$ or $Sb_2O_3$.

---

The invention relates to a range of glass composition particularly suitable for use in a secondary-emission electrode.

A single secondary-emission electrode comprises a tube of insulating material, for example, glass, the whole inner surface of which is coated with an electrically conductive layer of uniform thickness, having a fairly high resistivity and, in addition, a coefficient of secondary emission of electrons of more than 1. An electrode emitting electrode is provided at one end of the tube, whereas at the other end an electrode is arranged for capturing the emerging electrons. An electrical potential difference is applied between the electrodes.

The secondary-emission amplification is produced in the electrode in the following manner. There are comparatively few electrons which traverse the tube from one electrode to the other undisturbed, without striking the wall, under the action of the potential difference applied between the ends of the tube. Apart from a velocity component in the forward direction, the other electrons also have a velocity component in a lateral direction, so that the electrons strike the wall once or several times during their travel through the electrode, the electrons releasing at the impact each two or more electrons. In this way the density of the flow of electrons emanating from the electrode is materially increased as compared with the density of the electron flow entering the electrode.

In order to avoid feedback a single secondary-emission electrode is often shaped in the form of a coil.

In order to maintain a uniform voltage distribution along the electron paths an adequate quantity of electrons should be supplied from the voltage source to replace the secondary electrons conducted away. The resistivity of the material of the tube wall must not be so low that a marked increase in temperature occurs. As a matter of course, conduction must be obtained by the electrons. Conduction by ions would, in general, not be desired for other reasons, since the ion transport would produce alterations of the material, which might give rise to cracks. The material of the electrode may be glass having a resistivity lying between $10^9$ and $10^{12}$ ohm-cm., while the walls of the tube are coated with a thin layer of a material having a secondary-emission factor with the usual electron velocity exceeding 1.

For the coating a material is required, which has a surface resistance of the order of $10^9$ ohm $^2$ and, as stated above, an electrical conductivity mainly provided by the electrons.

Known electrically conductive glasses, also those containing $V_2O_5$—$P_2O_5$ and PbO, which glasses must be reasonably workable for the intended use, proved however, to have an excessive electrical conductivity by ion transport.

The electrodes are manufactured in a most simple manner by starting from a tube of a substrate glass, coated on the inner side by means of a suspension with a layer of the electrically conductive glass, the tube being subsequently drawn to a final diameter of 1 mm. Satisfactory workability means that the viscosity of the glass coating should be such that, when a suitable glass of corresponding viscosity is used, no devitrification occurs during the drawing process.

It is a principal object of the invention to provide a range of glass compositions which satisfies the aforesaid requirements. Further objects of the invention will appear as the specification progresses.

The glass according to the invention, containing $V_2O_5$, $P_2O_5$ and PbO, has a composition lying within the limits indicated in percent by weight:

| | |
|---|---|
| $V_2O_5$ | 30–80 |
| $P_2O_5$ | 5–22 |
| $Sb_2O_3$ | 0–20 |
| $As_2O_3$ | 0–6 |
| PbO | 0–14 |
| BaO | 0–5 |
| CaO | 0–2 |
| $B_2O_3$ | 0–25 |
| $Bi_2O_3$ | 0–25 | an additional condition being, however, that

| | |
|---|---|
| $V_2O_5 + P_2O_5$ | 45–95 |
| $As_2O_3 + Sb_2O_3$ | 1.5–22 | and

| | |
|---|---|
| $P_2O_5 + Bi_2O_3 + As_2O_3 + Sb_2O_3$ | 18–35 |

The resistivity of the glasses according to the invention is about $10^3$ to $10^8$ ohm-cm. at 50° C. Since the tubular electrode of the final diameter the glass is only present in a layer of a few tens of microns on the inner side of the substrate glass, this value corresponds approximately with the condition in which the electrode consists completely of one kind of glass of a resistivity of $10^9$ to $10^{12}$ ohm-cm.

A further type of secondary-emission electrode comprises a body having two parallel boundary surfaces, provided with a plurality of channels preferably arranged at right angles to said boundary faces or in a different position and open at both ends. The channels of these type of electrodes have the same structure as the aforesaid single secondary-emission electrode and the intensification of the emission is obtained in the same manner. These electrodes permit the intensifying of an electron distribution in the form of an image. They may be used for example in image intensifiers.

Such a channel-lined secondary-emission electrode of a diameter of, for example, 3 to 10 cm., having a thickness of 1 to 2.5 mm. and a number of channels in a cross-section of about $10^5$ per square cm. of a diameter of $10\mu$ per square cm. is manufactured as follows. A number of tubes equal to the number of openings of the electrode body is joined in a jig and heated in common, so that by the shrinkage of the jig the wall material of the tubes fuses and fills out the interstices. In order to facilitate fusing of the tubes, while the channels in the electrode are maintained, the material of the tubes is formed by a soft substrate glass, that is to say glass having a low softening temperature, coated on the inner side with a layer of a thickness of a few microns of a special glass showing electron conductivity.

With this particular technique the choice of the glass is more critical with respect to the aforesaid single electrode in view of devitrification of the glass during the drawing process.

Within the aforesaid range of glass compositions there is a preferred range of compositions of glasses extremely suitable for use in the manufacture of channelized electrodes, which glasses do not exhibit any trace of devitrification, even after repeated drawing of the glass to smaller diameters. Moreover, the value of the resistivity is satisfactorily reproducible.

The preferred range of compositions in percent by weight is as follows:

$V_2O_5$ ---------------------------------------- 55–72
$P_2O_5$ ---------------------------------------- 5–22
PbO ---------------------------------------- 0–10
$As_2O_3$ ---------------------------------------- 1–6
$Sb_2O_3$ ---------------------------------------- 0–18
$B_2O_3$ ---------------------------------------- 1.8–8 total of Ca, calculated as CaO, <1, total of Ba, calculated as BaO, <1, on the additional condition that $P_2O_5 + B_2O_3 + As_2O_3 + Sb_2O_3$ ---------------- 25–35 and $As_2O_3 + Sb_2O_3$ ---------------------------- 1.5–22

The resistivity of the glasses in this preferred range is about $10^4$ to $10^8$ ohm/cm. at 50° C.

A further preferred range of compositions, in which the resistivity lies between $10^5$ and $10^7$ ohm/cm., while the workability is extremely satisfactory, is the following percent by weight:

$V_2O_5$ ---------------------------------------- 60–70
$P_2O_5$ ---------------------------------------- 5–22
PbO ---------------------------------------- 3–10
$As_2O_3$ ---------------------------------------- 1–6
$Sb_2O_3$ ---------------------------------------- 5–18
$B_2O_3$ ---------------------------------------- 1.8–6 a total of Ca, calculated as CaO, <1, a total of Ba, calculated as BaO, <1, an additional condition being, however, that $P_2O_5 + B_2O_3 + As_2O_3 + Sb_2O_3$ ---------------- 26–32 and $As_2O_3 + Sb_2O_3$ ---------------------------- 6–22

The invention will be explained hereinafter with reference to a few examples.

EXAMPLE I

For the manufacture of a single secondary-emission electrode glass of the composition indicated in Table I was made by melting $V_2O_5$, $P_2O_5$, $Sb_2O_3$, minimum and, if desired, $CaCO_3$, $BaCO_3$, boric acid, $Bi(NO_3)_3 \cdot 5H_2O$ and $(NH_4)_2F_2$. The resultant glass was ground to a particle size of not more than 500μ and a fraction of a particle size of less than 140μ was sieved out and used for making a suspension in a solution of nitrocellulose in amylacetate with a viscosity being 62 times that of water. 3 gm. of glass powder was used per 2 gm. of solution.

A tube of glass of the following composition in percent by weight:

$SiO_2$ ---------------------------------------- 56.2
$Na_2O$ ---------------------------------------- 7.6
$K_2O$ ---------------------------------------- 4.5
PbO ---------------------------------------- 30.0
$Al_2O_3$ ---------------------------------------- 1.2
$Sb_2O_3$ ---------------------------------------- 0.3
MnO ---------------------------------------- 0.2 with a diameter of 7.5 mm. and a wall thickness of 0.5 mm. was coated with the suspension, then dried and heated at a temperature of 350° C. for 16 hours. The residual binder was decomposed and the powder melted in a uniform layer on the inner face of the tube. The tube was drawn to a diameter of 1 mm. and at the same time it was helically wound.

The electrodes were applied to the ends and the resultant secondary-emission electrode was evacuated.

Table II indicates a number of compositions beyond the range according to the invention, where no serviceable glass for the manufacture of a single secondary-emission electrode could be obtained.

TABLE I.—COMPOSITION IN WEIGHT PERCENT

| No. | $V_2O_5$ | $P_2O_5$ | $Sb_2O_3$ | $As_2O_3$ | PbO | BaO | $B_2O_3$ | CaO | $F_2$ | $Bi_2O_3$ | Log ρ 50° C. |
|---|---|---|---|---|---|---|---|---|---|---|---|
| 1 | 61.0 | 19.0 | 8.2 | | 7.5 | 4.3 | | | | | 6.20 |
| 2 | 64.0 | 20.0 | 5.1 | 2.3 | 5.2 | 1.8 | 0.4 | 1.0 | 0.2 | | 6.75 |
| 3 | 65.8 | 20.6 | 3.5 | 2.4 | 2.7 | 1.9 | 2.9 | | 0.2 | | 7.15 |
| 4 | 61.7 | 19.3 | 8.3 | 2.2 | 7.6 | | 0.4 | 0.3 | 0.2 | | 3.85 |
| 5 | 63.1 | 19.7 | 6.8 | 2.3 | 6.4 | | 1.2 | 0.3 | 0.2 | | 4.5 |
| 6 | 62.3 | 17.8 | 8.3 | 2.3 | 7.6 | | 1.2 | 0.3 | 0.2 | | 6.7 |
| 7 | 61.6 | 6.0 | 15.2 | 5.2 | 11.8 | | | | | | 5.55 |
| 8 | 77.1 | 15.8 | 3.3 | | 1.2 | | | | | 2.6 | 4.87 |
| 9 | 69.2 | 14.4 | 8.9 | | 5.7 | | | | | 11.8 | 5.63 |
| 10 | 44.2 | 13.3 | 13.6 | | 9.3 | | | | | 19.6 | 6.54 |
| 11 | 33.6 | 12.5 | 16.6 | | 12.7 | | | | | 24.6 | 6.40 |
| 12 | 64.5 | 11.7 | 8.6 | 2.3 | 7.9 | | 4.5 | 0.3 | 0.2 | | 2.80 |
| 13 | 63.4 | 16.4 | 8.5 | 3.5 | 5.2 | | 2.8 | | 0.2 | | 5.65 |
| 14 | 65.1 | 8.5 | 8.7 | 4.7 | 6.6 | | 6.2 | | 0.2 | | 3.35 |

TABLE II.—COMPOSITION IN WEIGHT PERCENT

| No. | $V_2O_5$ | $P_2O_5$ | $Sb_2O_3$ | $As_2O_3$ | PbO | BaO | $B_2O_3$ | CaO | $F_2$ | $Bi_2O_3$ |
|---|---|---|---|---|---|---|---|---|---|---|
| 15 | 65.5 | 2.0 | 9.7 | | 7.4 | | | | | 15.4 |
| 16 | 51.0 | 1.9 | 14.0 | | 10.7 | | | | | 22.4 |
| 17 | 86.9 | 6.2 | 3.2 | | 1.2 | | | | | 2.5 |
| 18 | 82.6 | 2.2 | 4.5 | | 3.5 | | | | | 7.2 |
| 19 | 89.0 | 7.1 | 1.6 | 1.1 | 1.2 | | | | | |
| 20 | 80.1 | 4.6 | 6.2 | 4.3 | 4.8 | | | | | |
| 21 | 33.6 | 5.0 | 21.8 | | 6.9 | | | | | 32.7 |

EXAMPLE II

Glass of one of the compositions indicated in Table III, obtained by melting a mixture of the relevent oxides and calcium fluoride in an oxidizing atmosphere was ground in a ball mill, having only one ball in order to avoid contamination with grindings, in alcohol for 72 hours and after drying it was again ground in the dry state for one hour. Powder of a particle size of more than 140μ was sieved out and removed. The powder was suspended in a ratio of 3 gm. of powder in 2 gm. of solution of nitrocellulose in amylacetate.

By means of this suspension, glass tubes of a diameter between 7 and 7½ mm., a wall thickness of 0.5 mm. and of a composition as indicated in Example I were coated on the inner side with a layer of a composition as indicated in Table III. For decomposing the binder the tubes were first heated at 350° C. and then at a temperature of 600° C. and drawn to tubes of a diameter of 1 mm. During a second treatment the tubes were further drawn to a diameter lying between 40 and 200μ.

In the manner described above a number of the tubes obtained were collected to form a secondary-emission electrode.

Table III indicates a number of glass compositions, in which $\rho$ designates the resistivity in ohm.-cm.

TABLE III.—COMPOSITION IN WEIGHT PERCENT

| No. | $V_2O_5$ | $P_2O_5$ | PbO | $As_2O_3$ | $Sb_2O_3$ | $B_2O_3$ | CaO | $CaF_2$ | BaO | Log $\rho$ 50° C. |
|---|---|---|---|---|---|---|---|---|---|---|
| 22 | 64.9 | 20.3 | 5.3 | 1.4 | 5.2 | 2.1 | 0.3 | 0.5 | | 4.8 |
| 23 | 63.2 | 16.5 | 7.7 | 1.4 | 8.4 | 2.0 | 0.3 | 0.5 | | 6.55 |
| 24 | 63.7 | 14.9 | 7.8 | 1.4 | 8.5 | 2.9 | 0.3 | 0.5 | | 6.45 |
| 25 | 64.2 | 13.4 | 7.9 | 1.4 | 8.6 | 3.7 | 0.3 | 0.5 | | 6.1 |
| 26 | 64.8 | 11.8 | 7.9 | 1.4 | 8.7 | 4.6 | 0.3 | 0.5 | | 5.8 |
| 27 | 64.1 | 16.6 | 5.2 | 2.2 | 8.6 | 2.9 | | 0.4 | | 5.65 |
| 28 | 65.5 | 17.0 | 4.0 | 2.2 | 7.0 | 3.8 | | 0.5 | | 6.6 |
| 29 | 61.9 | 16.6 | 7.9 | 1.4 | 8.6 | 2.9 | 0.3 | 0.4 | | 6.6 |
| 30 | 60.3 | 16.8 | 7.9 | 2.2 | 8.7 | 3.7 | | 0.4 | | 6.6 |
| 31 | 65.3 | 6.4 | 3.8 | 5.5 | 16.4 | 1.9 | 0.3 | 0.4 | | 6.5 |
| 32 | 69.5 | 21.7 | 1.4 | 1.6 | | 4.9 | 0.4 | 0.5 | | 6.65 |
| 33 | 67.0 | 17.4 | 2.7 | 2.3 | 5.4 | 4.7 | | 0.5 | | 7.1 |
| 34 | 68.6 | 17.8 | 1.4 | 2.3 | 3.7 | 5.7 | | 0.5 | | 6.75 |
| 35 | 70.2 | 18.3 | | 2.4 | 1.9 | 6.7 | | 0.5 | | 7.4 |
| 36 | 58.9 | 17.0 | 8.0 | 2.2 | 8.8 | 4.6 | | 0.5 | | 7.05 |
| 37 | 57.5 | 17.3 | 8.2 | 2.2 | 8.9 | 5.5 | | 0.5 | | 7.55 |

It should be noted that the glasses mentioned in Example I suitable for use in a single secondary-emission electrode are not suitable for the channelized electrode of this example. During the drawing process in several stages the tubes of one of the glasses mentioned in Table I, which lie beyond the preferred range, as an inner coating exhibit devitrification, so that cracks occur in the coating or even particles of the layer chip off.

What is claimed is:

1. A glass containing vanadium pentoxide, phosphorus pentoxide and lead oxide and especially adapted for use in a single secondary-emission electrode, said glass having the following composition in weight percent:

$V_2O_5$ ---------------------------------- 30–80
$P_2O_5$ ---------------------------------- 5–22
$Sb_2O_3$ --------------------------------- 0–20
$As_2O_3$ --------------------------------- 0– 6
PbO ------------------------------------- 0–14
BaO ------------------------------------- 0– 5
CaO ------------------------------------- 0– 2
$B_2O_3$ ---------------------------------- 0–25
$Bi_2O_3$ --------------------------------- 0–25

An additional condition being that $V_2O_5+P_2O_5$ --------------------------- 45–95
$As_2O_3+Sb_2O_3$ ------------------------- 1.5–22
$P_2O_5+B_2O_3+As_2O_3+Sb_2O_3$ ----------- 18–35

2. A glass as claimed in claim 1, especially adapted for use in a channelized secondary-emission electrode, the glass having the following composition in percent by weight:

$V_2O_5$ ---------------------------------- 55–72
$P_2O_5$ ---------------------------------- 5–22
PbO ------------------------------------- 0–10
$As_2O_3$ --------------------------------- 1– 6
$Sb_2O_3$ --------------------------------- 0–18
$B_2O_3$ ---------------------------------- 1.8– 8 total of Ca, calculated as CaO, <1, and total Ba calculated as BaO, <1, an additional condition being, that $P_2O_5+B_2O_3+As_2O_3+Sb_2O_3$ ----------- 25–35 and $As_2O_3+Sb_2O_3$ ------------------------- 1.5–22

3. A glass as claimed in claim 2, in which the composition lies within the following range indicated in percent by weight:

$V_2O_5$ ---------------------------------- 60–70
$P_2O_5$ ---------------------------------- 5–22
PbO ------------------------------------- 3–10
$As_2O_3$ --------------------------------- 1– 6
$Sb_2O_3$ --------------------------------- 5–18
$B_2O_3$ ---------------------------------- 1.8– 6 the total Ca, calculated as CaO, <1 and the total Ba calculated as BaO, <1, an additional condition being that:

$P_2O_5+B_2O_3+As_2O_3+Sb_2O_3$ ----------- 26–32 and $As_2O_3+Sb_2O_3$ ------------------------- 6–22

4. In the method of producing a glass composition as claimed in claim 1, by melting the constituent oxide compounds, the improvement which comprises melting the oxide compounds in an oxidizing atmosphere.

5. A secondary-emission electrode having an electrically conducting boundary layer consisting of a glass having a composition as claimed in claim 1.

References Cited

UNITED STATES PATENTS 3,258,434    6/1966    Mackenzie _____ 252—519

OTHER REFERENCES

Baynton et al.: Semiconducting Properties of Some Vanadate Glasses, Journal of The Electrochemical Society, April 1957, pp. 237–239.

Rawson: Inorganic Glass-Forming Systems, Academy Press, 1967, pp. 191–197.

JOHN DAVID WELSH, Primary Examiner

U.S. Cl. X.R.

106—47; 252—500; 313—103, 218